UNITED STATES PATENT OFFICE.

ARTHUR WELLINGTON STONER, OF AKRON, OHIO, ASSIGNOR TO THE MILLER RUBBER COMPANY, OF AKRON, OHIO, A CORPORATION OF OHIO.

PROCESS OF FORMING TUBES.

1,424,386.  Specification of Letters Patent.  Patented Aug. 1, 1922.

Application filed March 28, 1919. Serial No. 285,740.

*To all whom it may concern:*

Be it known that I, ARTHUR W. STONER, a citizen of the United States, and resident of Akron, Ohio, have invented certain new and useful Improvements in Processes of Forming Tubes, of which the following is a specification.

My present invention relates to improvements in inner tubes for pneumatic tires and the process of making the same and aims to provide a tube of equal thickness throughout having a smooth exterior, and to do this in an expeditious and economical manner.

The invention comprises the article and process of making the same as hereinafter described and particularly defined by the appended claims.

My invention is illustrated by aid of the accompanying drawings, in which.

Figure 1:
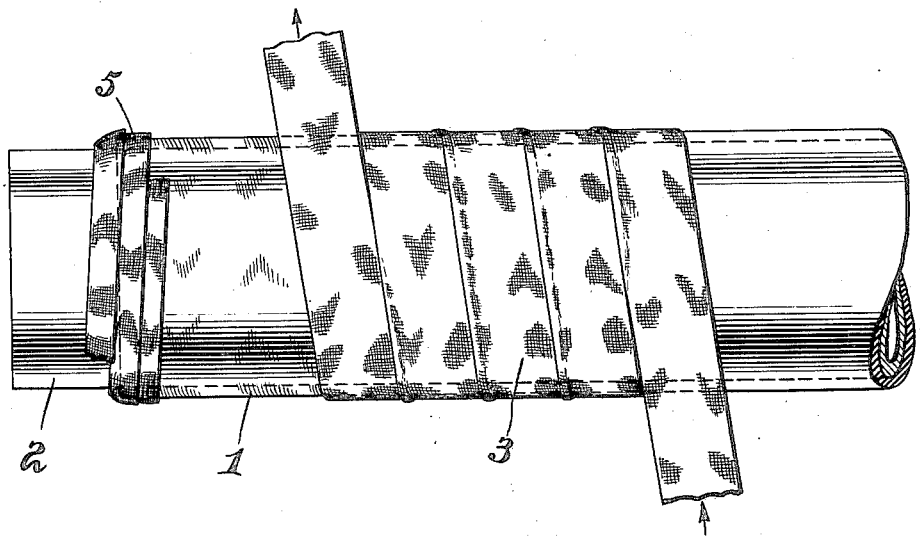
Figure 1 is a view of a mandrel with the tube material partially wrapped.
Figure 2:
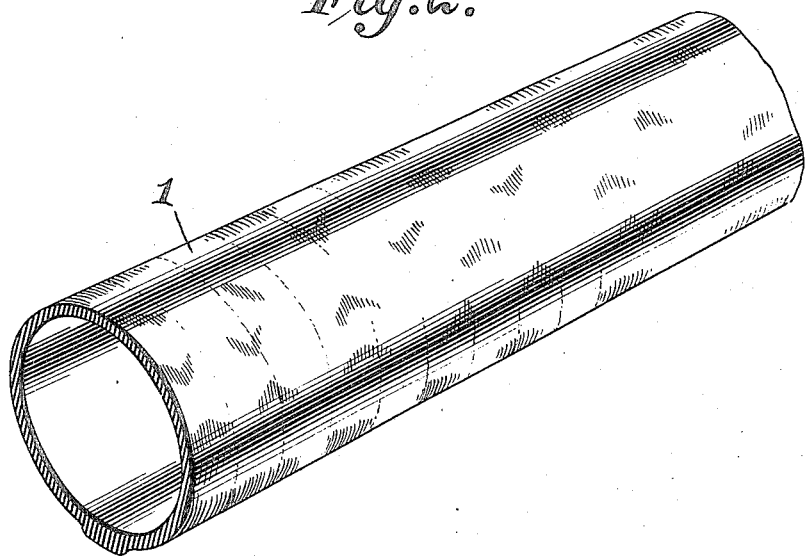
Figure 2 is a perspective view of a portion of a completed tube.

Prior to my invention inner tubes were usually made by rolling up a sheet of rubber compound upon a straight cylindrical metal tube, or by seaming a sheet of rubber compound and slipping the same over a straight cylindrical metal tube after seaming. The metal tube with the uncured rubber tube thereon was then wound spirally in overlapping relation with a frabic strip under tension, the fabric strip entirely covering the rubber tube from end to end. The fabric strip or rag was put on wet and was tied at the ends to prevent loosening. The metal tube or pole with the rubber tube and wrapping thereon was then placed in an open steam vulcanizer where it was exposed to steam under pressure until vulcanization of the inner tube had taken place. The poles were then removed from the heater or vulcanizer and after removing the fabric wrapping the rubber tube was stripped from the pole and turned inside out at the same time.

The side of the tube which was in contact with the wrapping was always found to be rough and corrugated spirally, due to the pressure of the wrapping. The fabric strips or "rags" used in wrapping the tubes were always exposed to water and steam at alternating low and high temperatures, consequently they rapidly deteriorated and broke under the tension, incidental to the wrapping process and were a constant source of unnecessary expense.

The tubes made by the above process were found to be non-uniform in thickness and therefore in tensile strength, because of the rag markings, which it was necessary to conceal from the customer by reversing the tubes before splicing.

According to my improved method, I first form or shape the rubber tube 1 upon the pole or mandrel 2 in the ordinary or any desired manner, preferably by winding a sheet of rubber composition onto the curing pole. I thereafter remove all air from between the tube and the pole and also all air occluded between the laminations of the rubber tube. This might be done in a number of ways, but I find a very successful method is to apply a spiral winding of fabric strip 3 overlapping each turn and by starting at one end and wrapping toward the opposite end, I force the air out progressively ahead of the wrapping. This wrapping may be of the same nature as that previously described, although it is not necessary to wet the rags as they are merely used to force out the air. After the wrapping has been entirely applied the air will be completely removed and the wrapper having accomplished this object, may then be removed immediately. If desired the wrapper may be applied and removed in one operation, the first end to be applied being unwound simultaneously with the application of the remainder of the wrapping.

It will be seen from the foregoing description that the wrapping rags do not pass through the vulcanizing process and their life is thus increased considerably, thereby reducing the cost of the process. In the case of very thick walled tubes, I prefer to leave the wrapping on the uncured tubes for a few minutes, rather than to remove them immediately after being applied as I find that the rubber compound then has a chance to flow slightly under the tension of the wrapping which smooths out the seams.

The air having been removed from between the pole and the rubber, I now apply a binding of rubber coated fabric tape 5 similar to that used by electricians for insulating wire, to the extreme ends of the rubber tube to prevent air or steam entering between the tube and the pole. The tubes are now ready to be vulcanized and are placed in an open steam horizontal vulcanizer, care being taken that the poles do not come in contact with each other. Steam is now allowed to enter the vulcanizer where it comes in direct contact with the rubber tubes on the poles. The pressure of the steam is held uniform at the proper temperature for the proper length of time to accomplish vulcanization. The steam supply is then shut off and a cooling fluid such as cold water is forced into the vulcanizer while all other openings to the vulcanizer remain closed. The cold water is preferably sprayed onto the tubes and cools the poles with the tubes thereon and the vulcanizer. The water supply is then shut off and a drain to the vulcanizer is opened, allowing the water therein to escape. The door of the vulcanizer is then opened and the poles with the tubes thereon removed. The binding of tape is removed from the tubes which are then removed from the poles in the usual manner.

In place of cooling the tubes with water while in the heater as described above, I find that good results may be accomplished by allowing the closed vulcanizer to cool by natural radiation, after the steam supply has been closed, until the pressure gauge attached to the vulcanizer shows a zero reading and then removing the tubes, but this is a slower process. In either case I find it disastrous to the tubes to open the vulcanizer before the tubes have been cooled to room temperature, as the rubber tubes are then inflated by the release of pressure on the outside, presumably by the expanding of gases formed by the heat between the poles and the tube or in the tube material.

By use of my invention an inner tube is produced which is uniform in thickness and therefore in tensile strength due to the absence of socalled wrapping marks or spiral ridges and valleys common to all other tubes made by the pole process and the saving in the cost of wrapping material is of consequence as I have found by trial that where but twelve tubes could be wrapped in succession under the old process with one piece of wrapping before it had to be thrown away it is possible by using my process to wrap four hundred tubes in succession with one wrapper.

What I claim is:—

1. The hereindescribed method of manufacturing tubes of vulcanizable material which consists in shaping the tube upon a suitable mandrel, wrapping the same helically with a strip of covering material under tension, removing the wrapping and thereafter vulcanizing the tubes.

2. The hereindescribed method of manufacturing tubes of vulcanizable material which consists in shaping the tube upon a suitable mandrel, rotating said mandrel, feeding a strip of covering material to said mandrel to cause it to be helically wound thereon under tension, removing said covering from the mandrel as it rotates, and finally vulcanizing the tube after the covering material has been removed.

3. The hereindescribed process of manufacturing tubes of vulcanizable material which consists in shaping the tube material on a suitable mandrel, applying preliminary pressure to the exterior surface of the tube progressively from one end to the other to eliminate entrapped fluid, removing said preliminary pressure and thereafter vulcanizing the tube.

4. The hereindescribed process of manufacturing tubes of vulcanizable material which consists in shaping the tube material on a suitable mandrel, applying temporary mechanical pressure progressively along the exterior surface of the tube to eliminate entrapped fluid, vulcanizing the tube while on the mandrel under fluid pressure, and cooling the article while still on the mandrel and before removing from the vulcanizer.

5. The hereindescribed process of manufacturing tubes of vulcanizable material which consists in shaping the tube upon a suitable mandrel, wrapping the same helically with a strip of covering material under tension, removing the wrapping, sealing the ends of the tube and vulcanizing the tube under fluid pressure.

6. The hereindescribed process of manufacturing tubes of vulcanizable material which consists in shaping the tube material on a suitable mandrel, applying pressure to and removing it from the exterior surface of the tube progressively from one end to the other to eliminate entrapped fluid, subsequently vulcanizing the tube, and cooling the tube before removing from the vulcanizer.

7. A method of preparing rubber tubes for vulcanizing upon a mandrel which consists in compressing the tube tightly against the mandrel to expel the entrapped air, sealing the ends air-tight against the mandrel, and removing the compressing means.

8. The method of forming and vulcanizing rubber tubes which consists in rolling the rubber stock upon a mandrel to form a tube, expelling the entrapped air from between the tube and the mandrel progressively from one end of the mandrel to the other, and vulcanizing the tube while unconfined from without.

9. The method of preparing rubber tubes for vulcanization consisting in mounting the tube upon a mandrel, wrapping the tube helically with a fabric strip, and removing the wrapping.

10. The method of vulcanizing rubber tubes consisting in mounting the tube upon a mandrel, expelling the entrapped air from between the tube and the mandrel progressively from one end of the mandrel to the other, and vulcanizing the tube in the absence of external confining means.

11. The method of vulcanizing rubber tubes wherein a sheet of rubber is rolled upon a mandrel and compressed against the mandrel by a helically wound strip of fabric which is removed prior to vulcanization, characterized by the fact that the rubber and fabric are allowed to remain in their associated relation before the latter is removed for a sufficient time to allow the rubber to flow to expel the air from between the tube and mandrel and to become set in its compressed position.

12. The method of preparing rubber tubes for vulcanization consisting in mounting the unvulcanized tube upon a mandrel, compressing it against the mandrel progressively from one end of the mandrel to the other, and maintaining the compressing means in position until the rubber has had sufficient time to flow to expel the air from between the tube and the mandrel and to become set in its compressed position.

13. The method of preparing rubber tubes for vulcanization consisting in mounting the tube upon a mandrel, wrapping the tube helically with a strip of fabric, allowing the tube with the fabric thereon to stand until the rubber has had sufficient time to flow to expel the air from between the tube and the mandrel and to become set in its compressed position, and removing the fabric wrapping.

14. The method of manufacturing tire tubes comprising, expelling air from between the uncured tube and a mandrel upon which it is mounted for vulcanization, by subjecting the tube to the action of a compressing means operating progressively from adjacent one end of the tube toward its opposite end, sealing the ends of the tube to the mandrel and curing the tube in a steam vulcanizer in the absence of said compressing means.

15. The method of vulcanizing tire tubes consisting in pressing the tube into intimate contact with the mandrel carrying the same by the application of circumferential pressure applied progressively from adjacent one end of the tube toward its opposite end and then vulcanizing the tube in an open steam vulcanizer while said contact is maintained and after the removal of the pressure applying means.

In testimony whereof, I affix my signature.

ARTHUR WELLINGTON STONER.